Sept. 1, 1953  L. L. BERNHEIM  2,650,464
FRUIT PICKER DEVICE

Filed Dec. 4, 1950  2 Sheets—Sheet 1

INVENTOR.
LOUIS L. BERNHEIM
BY George B White
ATTORNEY

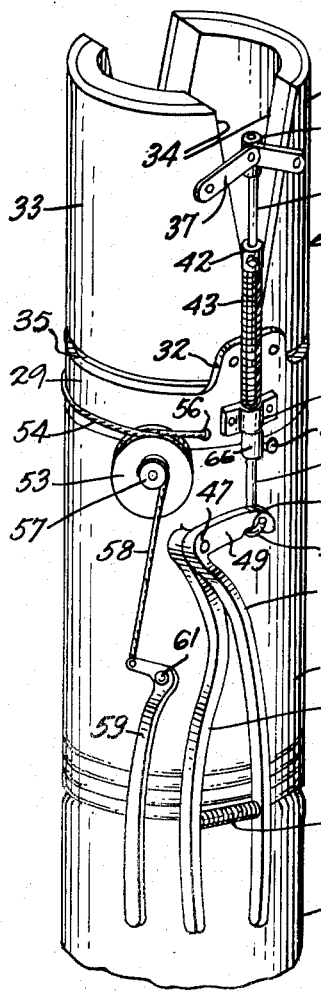
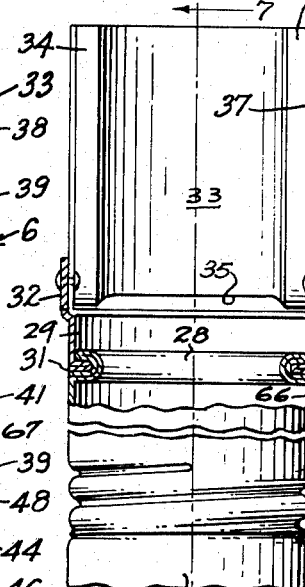
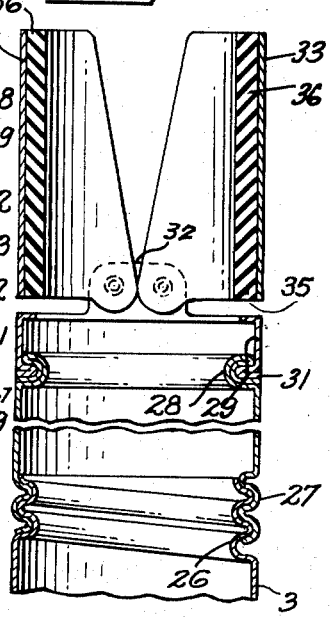
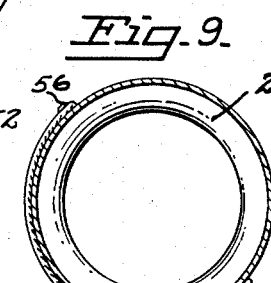
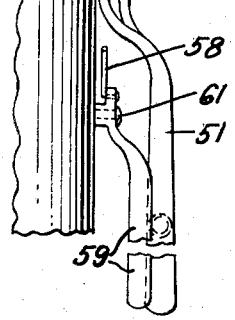

Patented Sept. 1, 1953

2,650,464

UNITED STATES PATENT OFFICE 2,650,464

FRUIT PICKER DEVICE

Louis L. Bernheim, Richmond, Calif.

Application December 4, 1950, Serial No. 198,971

6 Claims. (Cl. 56—328)

This invention relates to a fruit picker device.

The primary object of this invention is to provide a fruit picker whereby the fruit is easily picked individually and passed through a tube unto a cushioning element in a fruit box on a portable cart, which cushioning element is quickly and easily removable from under the picked fruit in the box, and thus the fruit is picked and collected efficiently and injury to the fruit is minimized, thereby saving time and labor and resulting in better product.

The features of my invention include: a flexible tube with a twistable or turnable picker at its intake end; a cart to which the outlet end of the tube is secured; a fruit box on the cart with a cushioning element in the box under the outlet of the tube to receive the fruit; the self-adjustability and shifting of the cushioning element under the weight of the collected fruit thereon, and the removability of the cushioning element from the box.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 5 is a perspective view of the picker device on the intake end of the tube.

Fig. 6 is a view of the picker device at said intake end, one of the claws and parts of the tube walls being broken away.

Fig. 7 is another sectional view of said picker device, taken on lines 7—7 of Fig. 6.

Fig. 8 is an elevational view of said picker device.

Fig. 9 is a plan view of the turning device for my picker device, the tube being shown in section.

Fig. 10 is a fragmental view showing the arrangement of the manipulating levers of the picking device.

Fig. 11 is a fragmental view with parts broken away of the turning device on said picking device.

Figure 2:
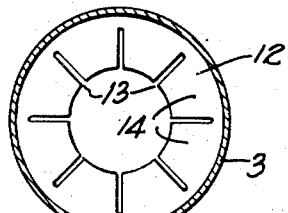
Fig. 2 is a sectional view of the fruit picker tube, the section being taken on the lines 2—2 of Fig. 3.

In the illustrative embodiment of my invention I make use of a wheeled cart 1 on which is carried a fruit box 2 of the usual type under the outlet end of a flexible conveyor tube 3 held on the cart 1. The fruit passing through tube 3 drops out of the tube on a cushioning pad 4 removably held in the fruit box 2. The flexible tube 3 is adapted to be carried by the person picking fruit and has on its free end or intake end a picking device 6.

The wheeled cart 1 may be of any suitable type. An upright bracket 7 on an end of the cart 1 has a retaining collar 8 thereon. A plurality of swivel hooks 9 pivoted on the collar 8 engage corresponding eyes 10 on the outlet end 11 of the tube 3 so as to hold said outlet end 11 in downwardly inclined position above the adjacent end of the fruit box 2.

Figure 3:
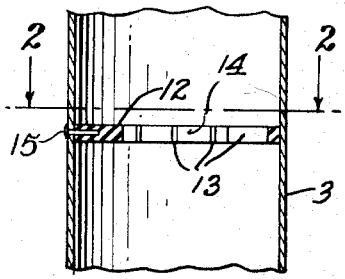
Fig. 3 is a fragmental view with parts broken away of the tube at a flexible baffle.
Figure 4:
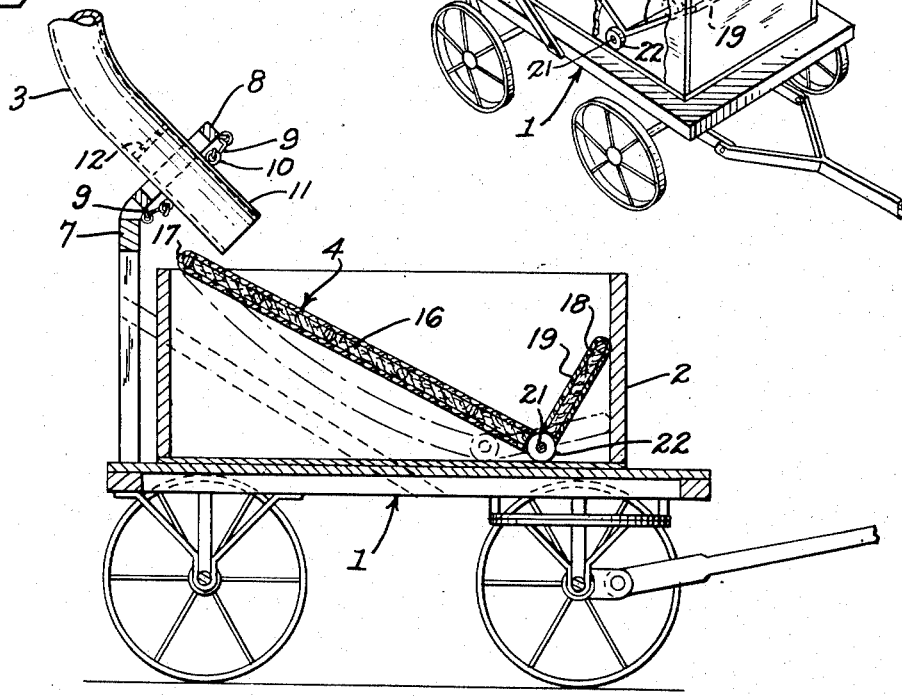
Fig. 4 is a fragmental elevational view of the collector portion of my device with the outlet end of the tube thereon.

The tube 3 is a suitable flexible tube of ample inner diameter to permit the free rolling of the picked fruit therethrough. One or more baffles 12 may be provided within the tube 3 for retarding the passage of the fruit and slowing down its drop. One of these baffles 12 is in the outlet end 11 as shown in Fig. 4. An illustrative form of this baffle 12 is shown in Figs. 2 and 3. The baffle 12 is a resilient ring, preferably made of comparatively thick rubber, and divided by radial slots 13 into inwardly extended flaps 14, which can be flexed or bent by the fruit. The base of the ring is secured to the tube 3 in any suitable manner, for instance by staples 15.

The cushioning pad 4, in the present illustration, includes a comparatively thick canvas padding 16 which has a rigid bar 17 on an end thereof. The padding 16 is substantially of the same width as the width of the fruit box 2. The rigid end bar 17 projects beyond the side edges of the padding 16 and rests on the top edges of the box 2 at the end of the box under the tube outlet end 11.

Figure 1:
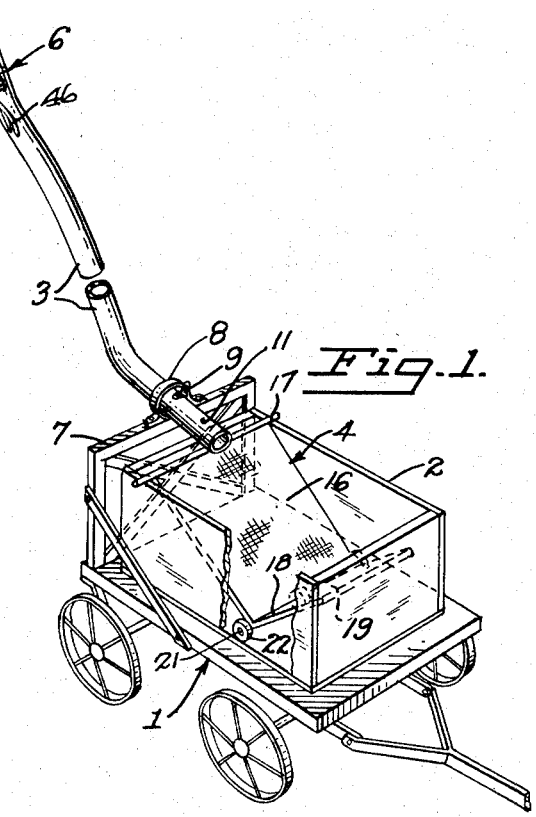
Fig. 1 is a perspective view with parts broken away of my fruit picker assembly.

The free end of the padding 16 is stiffened and hinged by a rigid skeleton frame 18. The hinge of the stiffened portion is nearer to the free end than to the suspended end of the padding 16 so that the stiffened portion 19 is less than one third of the length of the padding 16. The skeleton frame 18 is hinged on hinge bar 21, which latter is attached to the padding 16. On the opposite ends of the hinge bar 21 are narrow rollers 22 adapted to roll along the bottom of the box 2. The entire padding 16 is longer than the length of the box 2 so that in the initial position, shown in Figs. 1 and 2, the free end of the hinged portion 19 leans against the end of the box 2 farthest from the tube outlet end 11. The fruit drops on the downwardly inclined padding 16 and rolls toward the hinged portion 19. The fruit piles up gradually back on the padding 16 and by its weight gradually presses down the padding 16 between the hinge bar 21 and the suspension bar 17. As the padding 16 bulges downwardly it pulls the hinge bar 21 toward the suspended end. The rollers 22 facilitate this movement. As the hinge is shifted toward the suspended end of the padding the free end of the hinged portion 19 is lowered toward the box bottom and the fruit ultimately rolls over the hinged portion 19 to the box bottom. In this manner, after the box is filled, the padding 16 can be easily pulled from under the fruit and out of the box 2.

The fruit picking device 6 on the intake end of the tube 3 is adapted to be manipulated to gently but firmly grip the fruit, then to turn or twist it for removal, and finally release it into the conveyor tube 3 for collection in the box 2.

On the intake end of the tube 3 is suitably fixed a threaded portion 26. A cylindrical base 27 is threadedly fixed on the portion 26. An annular bearing channel 28 is formed around the top edge of the base 27. A rotatable collar 29 has its lower edge turned in and bent upon itself to form a retaining flange 31 which rotatably fits into the bearing channel 28 of the base 27. A pair of diametrically opposite ears 32 extend upwardly from the collar 29. A pair of opposed generally semi-cylindrical jaws 33 are pivoted on the ears 32. The edges 34 of the jaws 33 are cut back, so that the opposed edges respectively diverge toward the free ends of the jaws 33 and permit the swinging of the free ends of the jaws 33 toward one another. Each jaw is lined with a soft resilient lining 36, for instance a soft rubber lining to gently engage the fruit with sufficient friction for turning or twisting the fruit. The lower edges 35 of each jaw between the pivots are cut away or recessed to permit outward swinging of the jaws.

The manipulating device for picking the fruit, in this illustration includes toggle links 37 pivoted to the opposite jaws 33 on one side thereof. The toggle links 37 are pivoted on the head 38 of a rod 39 which latter is guided in a bearing 41. A collar 42 on the rod 39 spaced above the bearing 41 engages an end of a coil spring 43 around the rod 39. The other end of the coil spring 43 bears against the bearing 41 and thus normally urges the rod 39 upwardly so as to urge the toggle links 37 upwardly and pull the jaws 33 together. The lower end of the rod 39 has a hook 44 on it. A crank lever 46 is pivoted on a pivot 47 on the base 27 so that an elongated notch 48 in the head 49 of the crank lever 46 engages the rod hook 44. A handle 51 is fixed on the pivot 47 between the crank lever 46 and the base 27. A coil spring 52 between the lever 46 and the handle 51 normally pushes the lever 46 to its initial position shown in Fig. 5. When the crank lever 46 is pressed toward the handle 51, it pulls down the rod 39, straightens the links 37, and pushes the jaws 33 apart so that they may be inserted over the fruit. Then the releasing of the lever 46 permits the coil spring 43 to push the links 37 up and pull the jaws 33 together to grip the fruit.

The manipulating device for the twisting or turning action includes a reel 53 journalled on the base 27. A cord 54 is wound around the reel 53. The ends 56 of the cord 54 are fixed to the rotatable collar 29 at circumferentially spaced points so as to turn or rotate the collar 29 when the reel 53 is rotated. To the top of a hub 57 of the reel 53 is secured a pull cord 58. A crank lever 59 is pivoted on a pivot 61 on the base 27 along side of the handle 51 and opposite from the pulling crank lever 46. The other end of the pull cord 58 is secured to the head of this crank lever 59, so that when this second crank lever 59 is turned toward the handle 51 it pulls the pull cord 58 and turns the hub 57 and the reel 53 and thus turns the collar 29 and the jaws 33 therewith to twist the fruit gripped between said jaws 33. The reel 53 is a spring reel as shown in Fig. 11. The spring 62 within the reel 53 is anchored on the journal shaft 63 and normally urges the reel 53 in contra clockwise direction viewing Fig. 5 into the initial position in said figure.

The jaws 33 can be adjusted to an initial spacing to fit certain average sized fruit. A collar 66 is slidable on the rod 39 between the bearing 41 and the hook 44. A set screw 67 holds the collar 66 in an adjusted position. The collar 66 abuts the underside of the bearing 41 and thus predetermines the upward movement of the rod 39 and the spacing between the jaws 33.

In operation the cart 1 is wheeled and located under a tree. The operator suitably supports the inlet end of the conveyor tube 3 and holds the base 27 in his hand. The operator presses the crank lever 46 and the open jaws 33 are placed over the fruit and then the operator releases the crank levers 46 to grip the fruit and presses the other lever 59 toward the handle 51, and thereby turns the gripped fruit to remove it from the tree. Then the turning lever 59 is released and other lever 46 is pressed to release the fruit which then drops into the tube 3 and travels down through the baffles 12 to the outlet end 11 of the tube 3, and then drops onto the cushion padding 16 and is collected in the manner heretofore described.

I claim:

1. A fruit picking mechanism on a fruit conveying tube comprising a hollow base in continuation of the tube, a rotatable collar on said base, opposed jaws pivoted on said collar for gripping movement toward one another, a manipulating device on said base and connected to said jaws for moving said jaws toward one another for gripping a fruit and for releasing said jaws from said fruit, and a manipulating device on said base and connected to said collar for imparting turning motion to said collar and to the jaws thereon, and a soft resilient lining in each jaw for frictionally engaging the fruit between said jaws.

2. A fruit picking mechanism on a fruit conveying tube comprising a hollow base in continuation of the tube, a rotatable collar on said base, opposed jaws pivoted on said collar for gripping movement toward one another, a manipulating device on said base and connected to said jaws for moving said jaws toward one another for gripping a fruit and for releasing said jaws from said fruit, and a manipulating device on said base and connected to said collar for imparting turning motion to said collar and to the jaws thereon, and a soft resilient lining in each jaw for frictionally engaging the fruit between said jaws, the opposite edges of said jaws diverging from the pivoted ends toward the free ends of the respective jaws.

3. A fruit picking mechanism on a fruit conveying tube comprising a hollow base in continuation of the tube, a rotatable collar on said base, opposed jaws pivoted on said collar for gripping movement toward one another, a manipulating device on said base and connected to said jaws for moving said jaws toward one another for gripping a fruit and for releasing said jaws from said fruit, and a manipulating device on said base and connected to said collar for imparting turning motion to said collar and to the jaws thereon, said first mentioned manipulating device including toggle links pivoted on the adjacent jaws, a rod slidably supported longitudinally on said collar and connected to said toggle links, resiliently yieldable means connected to said rod to normally urge said rod in the direction for urging said jaws toward one another, and handle levers engageable with said rod for pulling said rod against the action of said yieldable means for shifting the relative positions of said jaws at will.

4. A fruit picking mechanism on a fruit conveying tube comprising a hollow base in continuation of the tube, a rotatable collar on said base, opposed jaws pivoted on said collar for gripping movement toward one another, a manipulating device on said base and connected to said jaws for moving said jaws toward one another for gripping a fruit and for releasing said jaws from said fruit, and a manipulating device on said base and connected to said collar for imparting turning motion to said collar and to the jaws thereon, said manipulating device for turning the jaws including a reel journalled on said collar, a line wound around said reel and having its ends extended oppositely to one another and anchored on the circumference of said collar, resiliently yieldable means related to said reel to urge said reel to an initial position, and handle means on said base and connected to said reel for imparting rotation to said reel against the action of said last mentioned yieldable means.

5. A fruit picking mechanism on a fruit conveying tube comprising a hollow base in continuation of the tube, a rotatable collar on said base, opposed jaws pivoted on said collar for gripping movement toward one another, a manipulating device on said base and connected to said jaws for moving said jaws toward one another for gripping a fruit and for releasing said jaws from said fruit, and a manipulating device on said base and connected to said collar for imparting turning motion to said collar and to the jaws thereon, said first mentioned manipulating device including toggle links pivoted on the adjacent jaws, a rod slidably supported longitudinally on said collar and connected to said toggle links, resiliently yieldable means connected to said rod to normally urge said rod in the direction for urging said jaws toward one another, and handle levers engageable with said rod for pulling said rod against the action of said yieldable means for shifting said jaws apart, said manipulating device for turning the jaws including a reel journalled on said collar, a line wound around said reel and having its ends extended oppositely to one another and anchored on the circumference of said collar, resiliently yieldable means related to the reel to urge said reel to an initial position, and handle means on said base and connected to said reel for imparting rotation to said reel against the action of said last mentioned yieldable means.

6. A fruit picking mechanism on a fruit conveying tube comprising a hollow base in continuation of the tube, a rotatable collar on said base, opposed jaws pivoted on said collar for gripping movement toward one another, a manipulating device on said base and connected to said jaws for moving said jaws toward one another for gripping a fruit and for releasing said jaws from said fruit, and a manipulating device on said base and connected to said collar for imparting turning motion to said collar and to the jaws thereon, said first mentioned manipulating device including toggle links pivoted on the adjacent jaws, a rod slidably supported longitudinally on said collar and connected to said toggle links, resiliently yieldable means connected to said rod to normally urge said rod in the direction for urging said jaws toward one another, and handle levers engageable with said rod for pulling said rod against the action of said yieldable means for shifting said jaws apart, said manipulating device for turning the jaws including a reel journalled on said collar, a line wound around said reel and having its ends extended oppositely to one another and anchored on the circumference of said collar, resiliently yieldable means related to the reel to urge said reel to an initial position, and handle means on said base connected to said reel for imparting rotation to said reel against the action of said last mentioned yieldable means, and a soft resilient lining in each jaw for frictionally engaging the fruit between said jaws.

LOUIS L. BERNHEIM.

References Cited in the file of this patent

UNITED STATES PATENTS

| Number | Name | Date |
|---|---|---|
| 771,267 | Read | Oct. 4, 1904 |
| 1,133,381 | Kellogg | Mar. 30, 1915 |
| 1,626,402 | Fryman | Apr. 26, 1927 |
| 2,288,682 | Chittenden | July 7, 1942 |
| 2,524,378 | Ellis | Oct. 3, 1950 |
| 2,581,236 | Cardinale | Jan. 1, 1952 |